US011874787B2

(12) United States Patent
Srivastava et al.

(10) Patent No.: US 11,874,787 B2
(45) Date of Patent: Jan. 16, 2024

(54) PLATFORM CONTROLLER HUB (PCH) CHIPSETS IN PLATFORMS AS EXTENDED IO EXPANDER(S)

(71) Applicant: Intel Corporation, Santa Clara, CA (US)

(72) Inventors: Amit K Srivastava, Folsom, CA (US); Majid Shushtarian, Pleasanton, CA (US); Anand K Enamandram, Folsom, CA (US); Jared W Havican, Folsom, CA (US); Jeffrey A Pihlman, Steilacoom, WA (US); Michael J Karas, Beaverton, OR (US); Ramamurthy Krithivas, Chandler, AZ (US); Christine Watnik, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 16/790,648

(22) Filed: Feb. 13, 2020

(65) Prior Publication Data

US 2020/0183872 A1   Jun. 11, 2020

(51) Int. Cl.
  *G06F 13/40*   (2006.01)
  *G06F 9/4401*   (2018.01)

(52) U.S. Cl.
  CPC ........ *G06F 13/4063* (2013.01); *G06F 9/4403* (2013.01); *G06F 9/4418* (2013.01)

(58) Field of Classification Search
  CPC ... G06F 13/4063; G06F 9/4403; G06F 9/4418
  (Continued)

(56) References Cited

U.S. PATENT DOCUMENTS

| 6,145,036 A * | 11/2000 | Barenys ............... G06F 13/4291 |
| | | 714/48 |
| 6,640,316 B1 * | 10/2003 | Martin ................ G06F 11/1417 |
| | | 714/36 |

(Continued)

FOREIGN PATENT DOCUMENTS

TW   201918880 A   5/2019

OTHER PUBLICATIONS

The Computer in your computer—The Intel Management Engine Jan. 13, 2020 (Year: 2020).*

(Continued)

*Primary Examiner* — Paul R. Myers
(74) *Attorney, Agent, or Firm* — Compass IP Law PC

(57) ABSTRACT

Methods to dynamically configure, monitor and govern PCH Chipsets in platforms as extended IO-expander(s) and associated apparatus. A multi-role PCH is provided that may be dynamically configured as a legacy PCH to facilitate booting for platforms without bootable CPUs and as IO-expanders in single-socket and multi-socket platforms. A control entity is coupled to the PCHs and is used to effect boot, reset, wake, and power management operations by exchanging handshake singles with the PCHs and providing control inputs to CPUs on the platforms. The single-socket platform configurations include a platform with a CPU with bootable logic coupled to an IO-expander and a platform with a legacy CPU coupled to a legacy PCH. The multi-socket platforms include a platform with a bootable CPU coupled to one or more non-legacy CPUs and employing multiple IO-expanders and platform with a legacy CPU coupled to one or more non-legacy CPUs and coupled to a legacy PCH, and further including one or more PCHs coupled to the non-legacy CPU(s) implemented as IO-expanders.

14 Claims, 9 Drawing Sheets

(58) Field of Classification Search
USPC .......................................................... 710/300
See application file for complete search history.

(56) References Cited

U.S. PATENT DOCUMENTS

| | | | | |
|---|---|---|---|---|
| 6,754,751 B1* | 6/2004 | Willke | ................ | G06F 13/4004 |
| | | | | 710/53 |
| 2003/0140163 A1* | 7/2003 | Peshkin | ................... | H04L 9/40 |
| | | | | 709/238 |
| 2011/0153914 A1* | 6/2011 | Huffman | ................ | G11C 16/10 |
| | | | | 711/E12.001 |
| 2011/0302329 A1* | 12/2011 | Azam | ................. | G06F 13/4081 |
| | | | | 710/16 |
| 2012/0144212 A1* | 6/2012 | Fu | ........................ | G06F 1/3275 |
| | | | | 713/300 |
| 2012/0311384 A1* | 12/2012 | Li | ........................ | G06F 11/2284 |
| | | | | 714/E11.02 |
| 2013/0246671 A1* | 9/2013 | Henning | ................... | G06F 3/06 |
| | | | | 710/36 |
| 2013/0290785 A1* | 10/2013 | Truong | ............... | G06F 11/2733 |
| | | | | 714/30 |
| 2014/0095911 A1* | 4/2014 | Rosenzweig | ......... | G06F 1/3209 |
| | | | | 713/323 |
| 2015/0153796 A1* | 6/2015 | Wu | ............................ | G06F 1/28 |
| | | | | 713/300 |
| 2015/0355699 A1* | 12/2015 | Castro-Leon | ......... | G06F 1/3206 |
| | | | | 713/323 |
| 2015/0370661 A1 | 12/2015 | Swanson et al. | | |
| 2016/0041938 A1* | 2/2016 | Ishii | .................... | G06F 13/4282 |
| | | | | 710/313 |
| 2016/0328300 A1* | 11/2016 | Rahardjo | ............ | G06F 11/1417 |
| 2016/0371206 A1* | 12/2016 | Maung | .................... | G06F 13/20 |
| 2017/0293331 A1* | 10/2017 | Han | ........................ | G06F 1/206 |
| 2018/0089048 A1* | 3/2018 | Zou | ........................ | G06F 1/206 |
| 2018/0349608 A1* | 12/2018 | de Cesare | ............. | G06F 21/575 |
| 2019/0188081 A1* | 6/2019 | Gao | ..................... | G06F 11/1417 |
| 2019/0251055 A1* | 8/2019 | Chen | ..................... | G06F 1/3228 |
| 2019/0311126 A1 | 10/2019 | Areno et al. | | |
| 2020/0005728 A1* | 1/2020 | Kurd | ........................ | G09G 5/18 |
| 2020/0183872 A1* | 6/2020 | Srivastava | ............. | G06F 9/4403 |
| 2020/0273300 A1* | 8/2020 | Zhao | ........................ | G06F 11/32 |
| 2021/0026964 A1* | 1/2021 | Gopal | .................... | H04L 9/0897 |

OTHER PUBLICATIONS

International Search Report and Written Opinion for PCT Patent Application No. PCT/US20/60416, dated Apr. 16, 2021, 13 pages.

* cited by examiner

PLATFORM CONTROLLER HUB (PCH) CHIPSETS IN PLATFORMS AS EXTENDED IO EXPANDER(S)

Personal computer systems implemented a chipset architecture known as the Northbridge-Southbridge architecture that included a central processing unit (CPU) coupled to a Northbridge chip (or simply "Northbridge") via a front-side bus (FSB), which in turn was coupled to the Southbridge chip (or simply "Southbridge") via an internal bus or interconnect. The Northbridge included a memory controller coupled to memory and thus is also referred to as the memory controller hub (MCH) or graphics and memory controller hub (GMCH) when it further included integrated graphics support. The Northbridge may also have included a high-speed graphics bus such as Accelerated Graphics Port (AGP) or Peripheral Component Interconnect (PCI) Express (aka PCIe).

The Southbridge handled the PC's Input-Output (IO) functions, such PCI (local) bus, Universal Serial Bus (USB), audio, serial, the system BIOS (Basic Input-Output System, aka Firmware), the ISA (Industry Standard Architecture) bus, the interrupt controller, and the IDE (Integrated Drive Electronics) channels, among other IO functions. The PC's BIOS/Firmware was stored on a BIOS ROM or Flash chip connected to the Southbridge chip via a low pin-count (LPC) Bus. For Intel® chipsets, the Southbridge was called the IO Controller Hub (ICH), while AMD® referred to its Southbridge as the Fusion Controller Hub (FCH)

As the internal clock frequencies of CPUs continued to increase, the FSB became a performance bottleneck, leading to System-on-Chip (SoC) processor architectures under which various Northbridge functions including integrated memory controller(s) are integrated into the die as the processor CPU. Under SoC processor architectures such as introduced by Intel® "Sandy Bridge" processor, the Southbridge was replaced by the Platform Controller Hub (PCH). Subsequently, several SoC processor architectures have incorporated many of the IO functions on the SoC, leading to platforms that do not include a PCH. For example, many of today's laptop and notebook computers with Intel® SoC processors do not include a PCH.

In parallel with improvements to laptop and notebook processors, SoC processor architectures used in data center platforms (e.g., various server architectures) have likewise evolved, along with the platform architectures themselves. For example, SoC processors targeted for the data center, such as Intel® Xeon® processors, have increased core counts, reducing the processor die real estate available to support IO functions and interfaces. In addition, data center server platforms often employ multi-socketed architectures under which multiple high-performance SoC processors are installed and interconnected with high-speed socket-to-socket interconnects, which further consumes valuable processor die real estate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
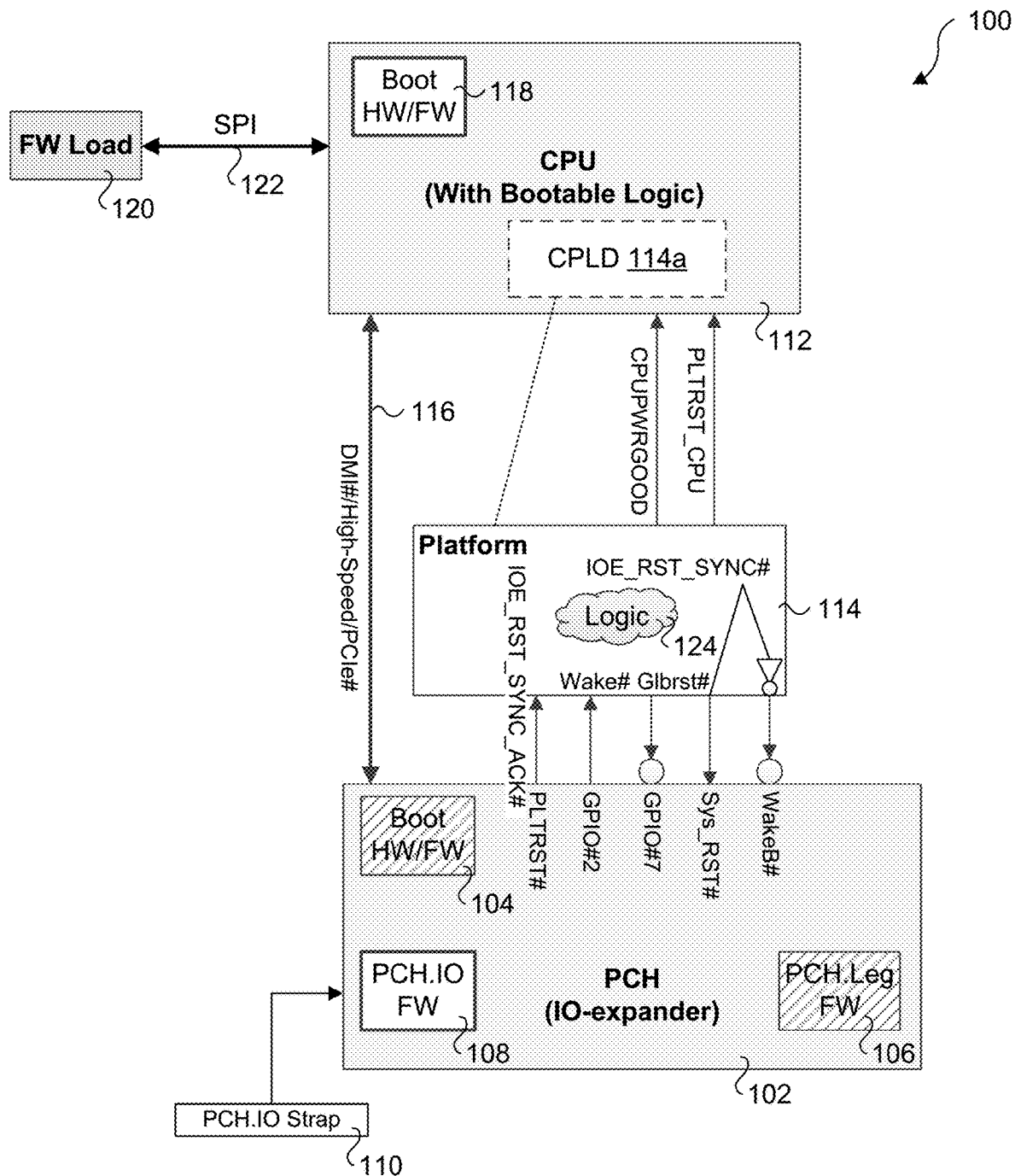
FIG. 1 is a schematic diagram illustrating an embodiment of a single-socket platform including a CPU with bootable logic and implementing a multi-role PCH as an IO-expander.

Embodiments of methods to dynamically configure, monitor and govern PCH Chipsets in platforms as extended IO expander(s) and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

A strategic direction for data center CPUs is to move the boot control function from the PCH to the CPU. However, there are existing and expected customer usage models that value PCH features beyond only the boot function. Examples of such usage models are High Speed IOs (aka HSIO) such as PCIe, SATA, USB etc., as well as clocking, manageability and security features. This creates a usage model where the OEM (Original Equipment Manufacturer) may want to instantiate a PCH to act as an "IO-expander" (i.e. expand and increase the number of IO interfaces) with a CPU as a boot control configuration. Further, the PCH can also support standard 1.8V/3.3V IO levels and therefore can be used without external level translation logic. These benefits provide added value to the platform and subsequently results in reduced BOM (Bill of Material) cost and reduction of valuable real estate.

In accordance with aspects of the embodiments disclosed herein, a novel dynamically configurable multi-role PCH solution is provided under which a PCH may be configured to operate as a "legacy" PCH to serve a legacy PCH role supporting existing boot functionality or the multi-role PCH may be configured to operate as an IO-expander under which the PCH is used to expand the IO interfaces available to a CPU to which the IO-expander is coupled. In one aspect, the multi-role PCH solution uses the same PCH device (e.g., the same manufactured part or SKU), wherein the solution implements a deterministic firmware (e.g., PMC, P-unit) flow, along with handshake wires between the PCH designated as the "legacy PCH" and several other PCH(s) which are designated as "IO-expanders."

As used herein, a "legacy" PCH is used by a "legacy" CPU to perform functions that have been associated with a PCH or similar chip for the past decade or more. This includes providing access to bootable firmware in a firmware storage device that is coupled to the legacy PCH to enable that firmware to be booted by a legacy CPU, which is a CPU that cannot be booted on its own and requires use of a legacy PCH to support booting.

The legacy PCH orchestrates the Boot/wake, Reset and Sx (sleep state) flows of the system/platform and triggers the IO-expanders to perform the same flows in tandem at critical points in the flow. The IO-expanders act as "slaves" and obey the legacy PCH, with handshake signals implemented by a control entity being used to signal state and/or configuration changes and confirm via handshake ACKnowledgements (ACKs) that the state and/or configuration changes have been completed. This provides for a deterministic and controllable system of interconnected chipsets.

Platform Policy Controlled Operation (Boot/Reset/Wake/Power Management)

In accordance with some embodiments employing a legacy PCH, the legacy PCH sends a trigger signal to all the IO-expanders when there is a need to perform a flow. Each IO-expander returns an "ACK" signal. These signals are received by and pass through a control and policy-making entity on the platform (the "control entity," also referred to as the "platform component"), which may be implemented as a CPLD (complex programmable logic device), a FPGA (field programmable gate array), an embedded controller, or similar device. Optionally, under some configurations the control entity may be implemented as a logic block in one of the CPUs. This control entity in effect is the "eyes and brain" of the platform that monitor the IO-expanders and may be configured to implement one or more policies desired by a user/operator if a problem is observed.

For example, in a system that consists of multiple IO-expanders the user can implement various policies to deal with scenarios where one or more of the IO-expanders are non-responsive. The control entity has complete observability and control, wherein:

a) The legacy PCH "trigger" signal going to the IO-expanders goes through the control entity. Therefore, this control entity knows when a trigger has occurred and, for example, can start a timer and wait for "ACK" responses from the IO-expanders.

b) If the ACK response from the IO-expanders are received back in time (e.g., before the timer expires) then the control entity can relay an aggregated ACK to the legacy PCH. Subsequently, the legacy PCH will continue with its flow to either boot up the system or proceed to power down (in connection with entry into an Sx state).

c) The user has substantial flexibility to implement policies. For example, if one or more of the IO-expanders fails to send an ACK, the control entity can be configured to first decide to isolate the errant IO-expander(s) and then relay an aggregated ACK to the legacy PCH so that the system will proceed as normal and not get hung. As an extension to this and similar scenarios, communication can be provided (e.g., via the control entity and/or the legacy PCH) to the CPUs to inform them of detected problems and/or issues.

Under an alternative policy, the control entity can trigger a Global reset of the system if any of the IO-expanders fail to respond.

The follow provides examples of single-socket and multi-socket platforms in which multi-role PCHs may be implemented. It is noted that these platform configurations are merely exemplary and non-limiting, as aspects of the PCH solutions disclosed herein may be implemented using a variety of platform configurations.

Single-Socket Platform with Bootable CPU and PCH as IO-Expander

FIG. 1 shows a CPU boot with single-socket PCH.IO-expander diagram 100 in which a multi-role PCH is implemented as an IO-expander in a single-socket system, according to one embodiment. As discussed above, a multi-role PCH may be configured to operate as or serve a "legacy" PCH role or an IO-expander role. Accordingly, when a multi-role PCH is configured to operate as a legacy PCH, the PCH is labeled with "PCH.legacy" in the Figures herein, while when a multi-role PCH is configured to operate as an IO-expander the PCH is labeled with "PCH.IO," such as shown by an IO-expander 102 in FIG. 1.

The multi-role PCH includes circuitry and logic to implement both the legacy PCH and IO-expander roles. This includes boot firmware/hardware (HW/FW) 104 and PCH.Leg firmware 106 used for the legacy PCH role and PCH.IO firmware 108 used for the IO-expander role. In the illustrated embodiment, the PCH.IO role is selected using a PCH.IO (pin) strap signal 110 that is applied to a selected pin on IO-expander 102, such as a General-Purpose IO (GPIO) pin. IO-expander 102 further is depicted with selected pins for effecting configuration setup and changes via handshake signals, including a platform reset number (PLTRST #) pin, a GPIO #2 pin, a GPIO #7 pin, a system reset number (Sys_RST #) pin, and a WakeB #pin.

Figure 2:
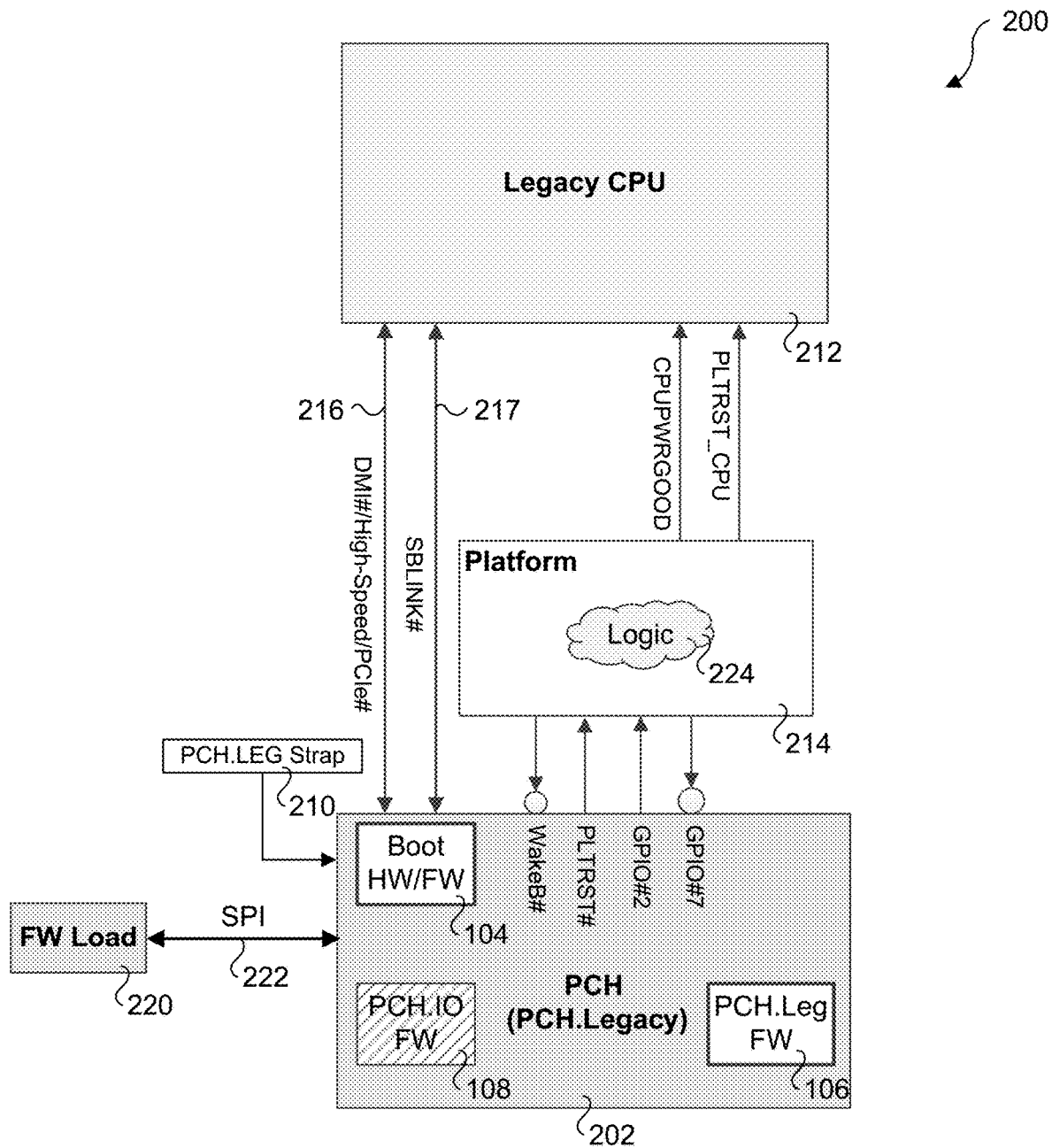
FIG. 2 is a schematic diagram illustrating an embodiment of a single-socket platform including a legacy CPU and implementing a multi-role PCH as a legacy PCH.

Diagram 100 further depicts a CPU 112 with bootable logic and a platform component 114 that is implemented as the platform control entity. CPU 112 is coupled to IO-expander 102 via a CPU-PCH interface 116. In one aspect, the IO-expander solution is agnostic to the CPU-PCH interface, such that various existing and future CPU-PCH interfaces may be implemented. For example, under one embodiment of a discrete configuration a Direct Media Interface (DMI) interface for on-chip package interface for CPU-PCH communication is used, while under another embodiment CPU-PCH interface 116 is implemented using a future PCIe link with power management control (PMC) assistance. CPU 112 employs an SoC architecture that includes bootable hardware/firmware (HW/FW) logic 118 to enable the CPU/SoC to boot itself and the rest of the system by loading firmware directly from a firmware storage device, as opposed to employing a legacy PCH to access the firmware storage device (such as illustrated in FIG. 2 and described below). As shown in FIG. 1, CPU 112 is configured to load firmware from a firmware storage device 120 over a Serial Peripheral Interface (SPI) 122 in this embodiment. The bootable HW/FW logic 118 manages loading and execution of the firmware to boot the CPU and platform.

An innovative aspect of the multi-role PCH schemes disclosed herein includes handshake logic implemented on IO-expander 102 and platform component 114, the latter of which operates as an interface between CPU 112 and IO-expander 102 and functions as the control entity. The handshake logic comprises boot- and sleep states S0- and Sx-related handshake logic that includes logic 124 on platform component 114 and logic on IO-expander 102 (e.g., PCH.Leg firmware 106 or PCH.IO firmware 108, based on the selected PCH role). The handshake signals include an IO expander Reset Sync Number (IOE_RST_SYNC #) signal, and an IOE_RST_SYNC_ACK #(ACKnowledgement number) signal, a Wake #signal, a global reset number (Glbrst #) signal. The IOE_RST_SYNC #signal is received at the Sys_RST #pin and the WakeB #pin. In response, IO-expander 102 returns an IOE_RST_SYNC_ACK #output at its PLTRST #pin. Platform component 114 further is configured to provide a CPU Power Good (CPUPWRGOOD) signal and a Platform reset CPU (PLTRST_CPU) signal to CPU 112 at appropriate times during boot/wake/ and power management flows.

Single-Socket Platform with legacy CPU and legacy PCH

FIG. 2 shows single-socket platform diagram 200 including a legacy CPU and legacy PCH, according to one embodiment. In this example, a multi-role PCH is configured to operate as a legacy PCH 202 through use of a PCH.LEG (pin) strap signal 210. In one embodiment, the same pin on a multi-role PCH may be used for PCH.IO strap signal 110 and PCH.LEG strap signal 210, wherein the selected PCH role depends on the logic level of the strap signal (e.g., PCH.IO strap signal 110 could be logic '0' and PCH.LEG strap signal 210 could be logic '1' or vice-verse). Optionally, PCH.IO strap signal 110 and PCH.LEG strap signal 210 may be provided as inputs to separate strap pins on the multi-role PCH.

When configured to operate as a legacy PCH, the PCH performs similar functions as today's PCHs, including boot-related functions. For example, in diagram 200 legacy PCH 202 is coupled to a legacy CPU 212 that does not have built-in boot support. Rather, legacy PCH 202 employs boot HW/FW 104 and PCH.Leg firmware 106 to load firmware from a firmware storage device 220 over SPI link 222. Communication between legacy CPU 212 and legacy PCH 220 is facilitated via a CPU-PCH interface 216 and a sideband link (SBLINK #) 217. As before, under one embodiment CPU-PCH interface 216 in implemented with DMI interface or other type of high-speed chip-to-chip communication, while under another embodiment CPU-PCH interface 116 is implemented using a future PCIe link with PMC assistance. Generally, SBLINK #217 may be implemented using any form of low-speed sideband communication.

A platform component 214 including logic 224 is used to effect control entity function(s) using applicable handshake signals and provide an interface between legacy CPU 212 and legacy PCH 202. In one embodiment, the same configurable multi-role PCH is used for both IO-expander 102 and legacy PCH 202, and thus pins on platform component 214 are connected to the same pins on the PCH, as depicted by the WakeB #pin, the PLTRST #pin, the GPIO #2 pin, and the GPIO #7 pin. At the same time, communication to support the legacy boot sequence of legacy CPU 212 is facilitated via CPU-PCH interface 216 and SBLINK #217.

CPU Boot for Multi-Socket Platform Including One or More IO-Expanders

Figure 3:
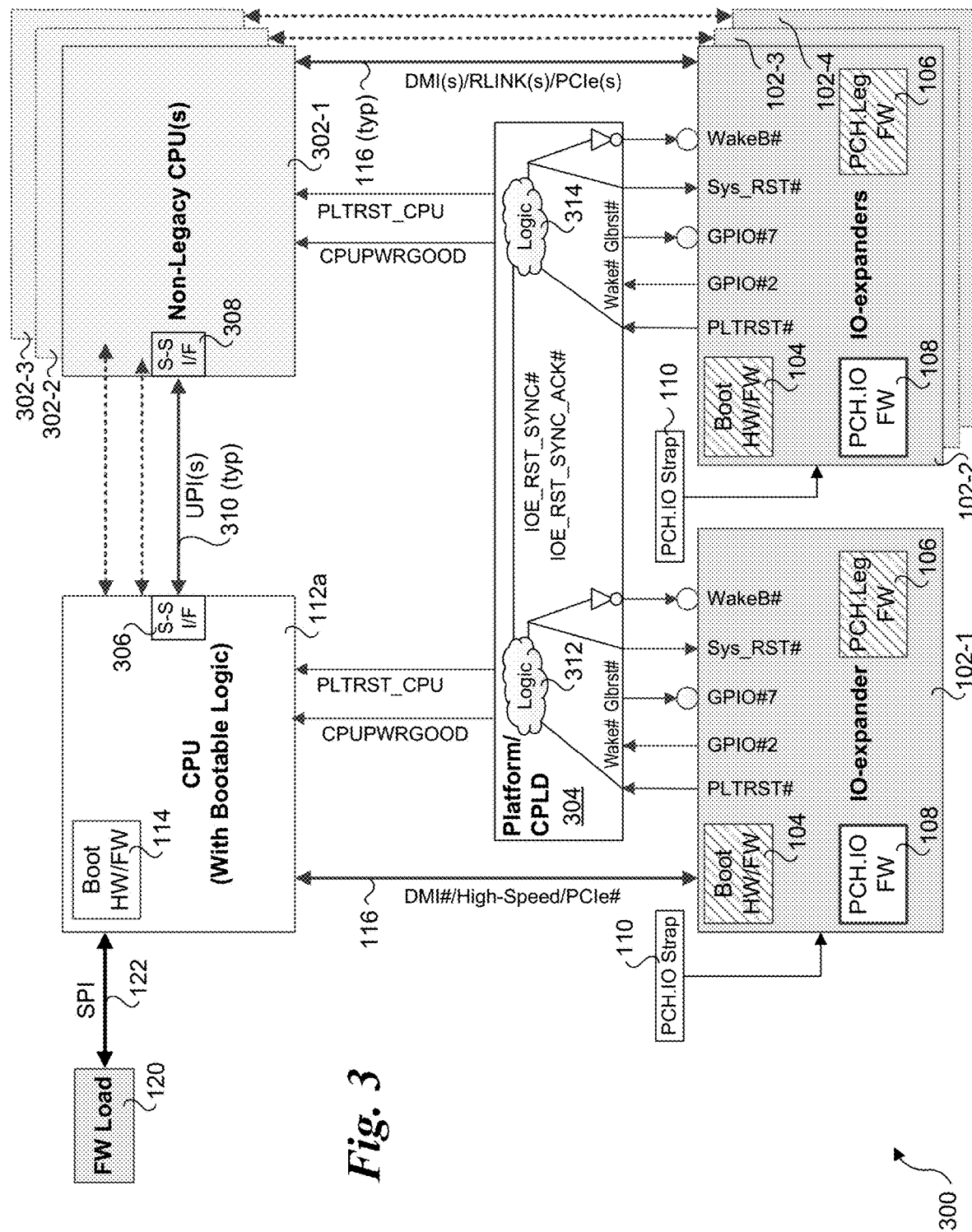
FIG. 3 is a schematic diagram illustrating an embodiment of a multi-socket platform including a CPU with bootable logic and implementing multiple multi-role PCHs as IO-expanders.

The novel IO-expander solution may be extended to support CPU boot configurations with multiple sockets and one or more IO-expanders. For example, FIG. 3 shows a CPU boot with multi-socket IO-expander diagram 300 illustrating the topology of an embodiment of a CPU boot+IO-expander system including multiple IO-expanders 102 (depicted as IO-expanders 102-1, 102-2, 102-3, and 102-4), a CPU 112*a* with bootable logic, one or more non-legacy CPUs 302 (depicted as CPUs 302-1, 302-2 and 302-3), and a platform component 304 configured to function as the control entity. As depicted by like-numbered components in FIGS. 1 and 3, the implementation of IO-expander 102-1 in the lower left and CPU 112*a* are similar to IO-expander 102 and CPU 112 in FIG. 1, with the difference being that CPU 112*a* further includes one or more a socket-to-socket interfaces (S-S I/F) 306 coupled to a respective socket-to-socket interface 318 on one or more of non-legacy CPU 302-1, 302-2, and 302-3 via a socket-to-socket interconnect 310. Also, each non-legacy CPU 302 is connected to a respective IO-expander 102 via a CPU-to-PCH interface 116.

Under various multi-socket topologies, different socket-to-socket interconnection configurations may be employed, such as a full interconnect configuration under which each socket is interconnected with each other socket or under a loop configuration under which each socket is interconnected to a pair of other sockets to form a loop or continuous chain of interconnected sockets. Under one embodiment the socket-to-socket interconnects comprise Universal Path Interconnects (UPI(s)); however, use of UPIs is merely exemplary and non-limiting, as other existing and future socket-to-socket interconnects may be used. Generally, a multi-socket platform configuration may include two or more sockets and two or more IO-expanders. It is noted, however, that there does not need to be a 1:1 relationship between a non-legacy CPU and an IO-expander, as under some embodiments a multi-socket implementation may include one or more non-legacy CPUs that are not coupled to an IO-expander.

Platform component 304 operates as the control entity providing an interface between CPU 112*a* and IO-expander 102-1 and provides an interface between each non-legacy CPU 302 that is coupled to an IO-expander 102. For simplicity, only the connection/signals between platform component 304 and non-legacy CPU 302-1 and between platform component 304 and IO-expander 102-2 are shown in FIG. 3; it will be understood that similar connections and signals would be implemented for each additional non-legacy CPU 302 and IO-expander 102.

On one level, the initialization and configuration of a CPU-IO-expander pair is similar for the single-socket and multi-socket implementations, as depicted by similar pins on the IO-expanders 102 in FIGS. 1 and 3. However, platform component 304 includes further logic (as depicted by logic 312 and 314) that is configured to coordinate the platform boot and PCI IO-expander initialization/configuration operations in accordance with one or more policies. This is explained in further detail below in connection with platform component 404 in FIG. 4 and the flowcharts of FIGS. 5 and 6.

Multiple PCHs Implemented as Legacy PCH and IO-Expander(s)

Figure 4:
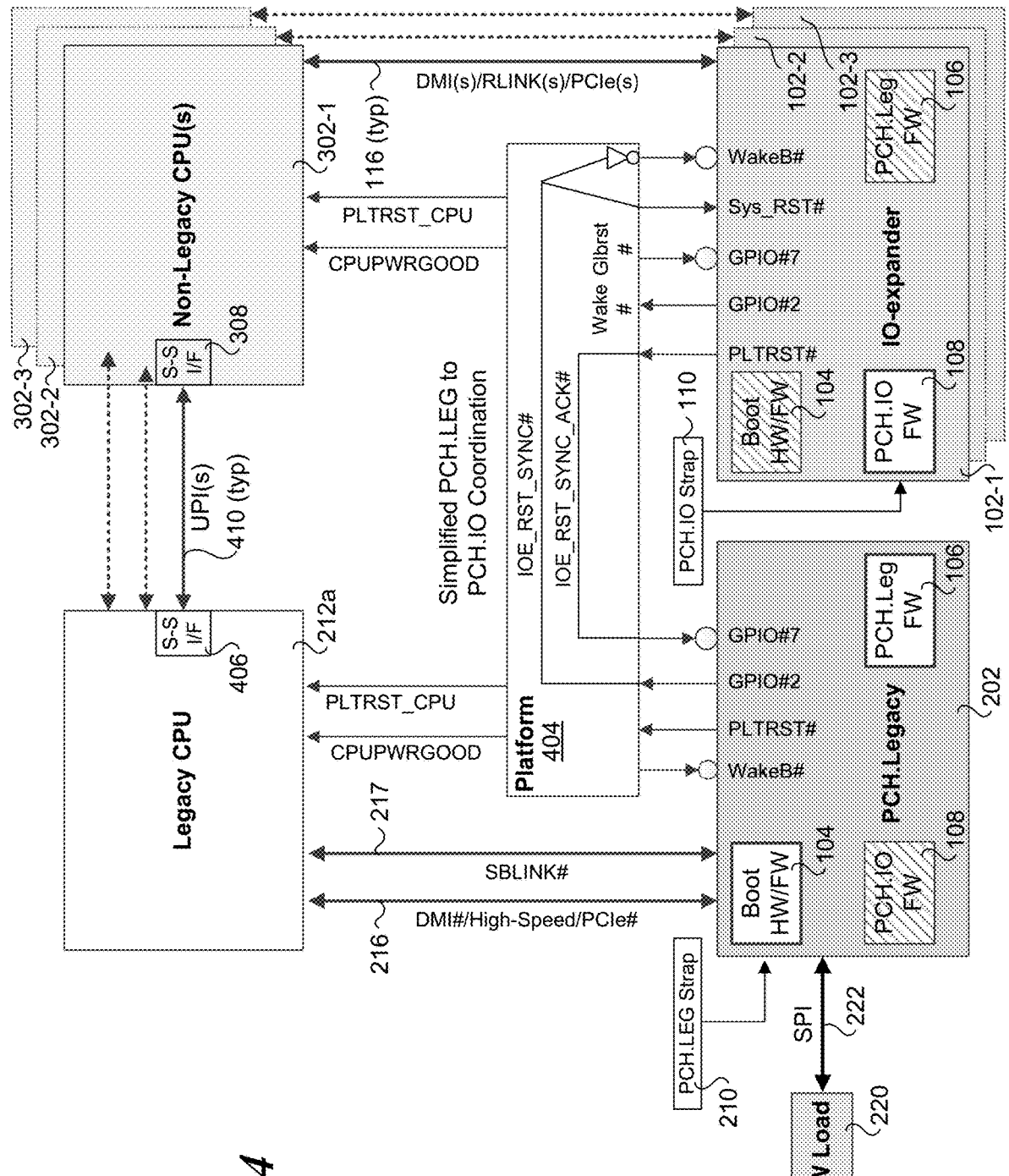
FIG. 4 is a schematic diagram illustrating an embodiment of a multi-socket platform including a legacy CPU and implementing one multi-role PCH as a legacy PCH, and one or more other multi-role PCHs as IO-expanders.

FIG. 4 shows a diagram 400 illustrating the topology of an embodiment of a legacy+IO-expander system including a legacy PCH 202, a legacy CPU 212a, one or more non-legacy CPUs 302 (depicted as non-legacy CPUs 302-1, 302-2, and 302-3), one or more IO-expanders 102 (depicted as IO-expanders 102-1, 102-2, and 102-3), and a platform component 404 implemented as a platform control entity. As depicted by like-numbered components in FIGS. 2 and 4, the implementation of legacy PCH 202 and legacy CPU 212a are similar, with the difference being that CPU 212a further includes one or more a socket-to-socket interfaces 406 coupled to a respective socket-to-socket interface 308 on one or more of non-legacy CPU 302-1, 302-2, and 302-3 via a socket-to-socket interconnect 410. As with the multi-socket platform configuration of FIG. 3, the multi-socket topology shown in FIG. 4 may employ different socket-to-socket interconnection configurations, such as full interconnect configurations and loop interconnect configurations.

Under a multi-socket platform employing a legacy CPU (e.g., a CPU without boot support), one PCH will be configured as the legacy PCH and all (e.g., one or more) other PCHs will be configured as IO-expanders. The legacy PCH will trigger the IO-expanders to perform a boot flow. The Boot/Wake and Sx power state entry flows are primarily orchestrated by the PCH that has been configured as the legacy PCH. This configuration is implemented by driving a designated input pin of the PCH during power up or when the system goes through a global Reset. The control entity on the system platform (e.g., platform component 404) is responsible for driving these PCH input pins and subsequently triggering a global reset (Glbrst #) to cause the PCH circuitry to latch the intended configuration.

This way a deterministic mechanism is put in place that guarantees that at any given time the state of each of the PCHs (legacy or IO-expander) is known and accounted for. By routing all the handshakes through a platform CPLD much flexibility is gained to implement various policies to handle scenarios when one or more of the IO-expanders may become non-responsive. This provides for complete visibility of the state of the components and control for including or excluding them in the system. In these cases, one can implement a policy that for example the faulty IO-expander be identified and subsequently isolated but at the same time proceed with the system boot/wake flow uninterrupted.

Boot and Wake Flow

Under embodiments employing a CPU with boot logic, the boot logic controls the boot process and Sx entry flows of the IO-expander through a handshake mechanism. The boot logic drives its GPIO output to the SYS_RST #and WAKE #inputs of the IO-expander through the platform CPLD. The IO-expander in turn drives its PLTRST #output to the GPIO input of the legacy PCH through the platform CPLD, where the state of the IO-expander can be determined from the PLTRST #signal and any suitable policies, timers, etc. can be implemented.

In some embodiments, the configuration/routing and policy settings at the platform level are implemented via the CPLD, FPGA, or other embedded controller or the like on the platform. In other embodiments, the functionality provided by the CPLDs illustrated herein are implemented as part of a CPU/SoC or connected to a CPU on a multi-chip package, such as depicted by CPLD 114a in FIG. 1.

Boot/Wake from Sx Sleep/Soft Off State

Figure 5:
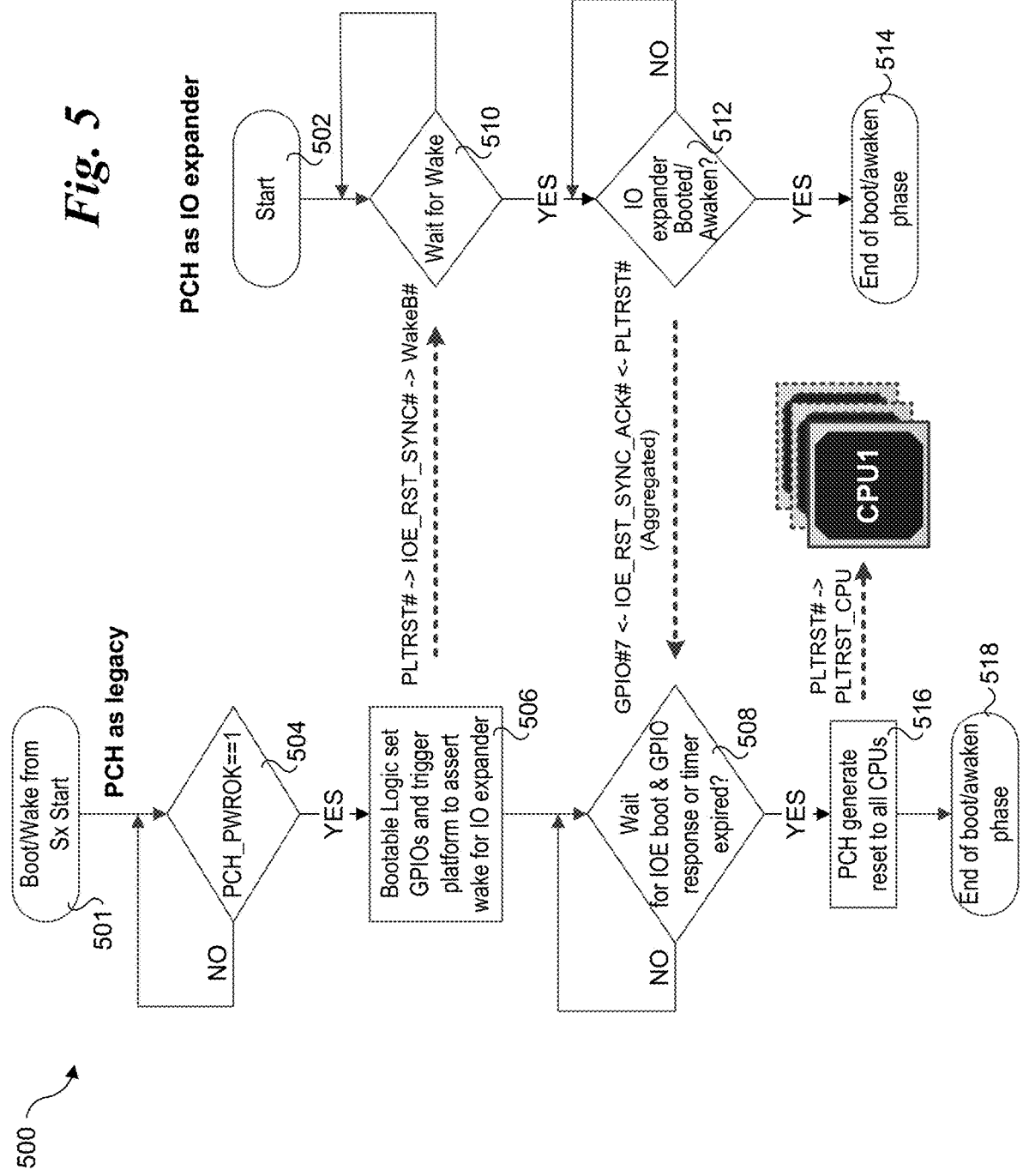
FIG. 5 is a flowchart illustrating handshake operations and logic performed for a legacy PCH and an IO-expander when a system or platform boots or when there is a wake from an ACPI Sx sleep state or soft off state, according to one embodiment.

FIG. 5 shows a flowchart 500 illustrating handshake operations and logic performed for a legacy PCH and an IO-expander when the system boots or when there is a wake from an Sx sleep/soft off state (i.e., one of the ACPI (Advanced Configuration and Power Interface) S1, S2, S3, or S4, sleep states or S5 soft off state), according to one embodiment. As depicted by the separate flows labeled PCH as legacy and PCH as IO-expander, the booting logic and IO-expander boot concurrently, beginning at start blocks 501 and 502. In start block 501, either a platform boot or a wake from Sx start occurs.

As depicted in a decision block 504 with loop back to itself a determination is made to whether the PCH power is OK (e.g., the logic detects that the PCH_PWROK signal is set). Once the PCH power OK signal is detected, the logic proceeds to a block 506 in which the bootable logic sets the GPIO that is mapped to the Wake #pin and triggers the platform to assert wake for the IO-expander. As shown in FIG. 4, legacy PCH 202 asserts and IOE_RST_SYNC #signal via the GPIO #2 pin that is received by platform component 404 and forwarded to the Sys_RST #Pin and the WAKEB #pin. The legacy PCH logic then proceeds to a decision block 508 to wait for the IO-expander and GPIO response or expiration of a timer.

In parallel, as depicted by a decision block 510 and the loop back to itself, the IO-expander waits for assertion of the wake (WakeB #) signal (at the WakeB #pin) from platform component 404. Upon receiving the wake signal, the IO-expander logic initiates booting and proceeds to a decision block 512 in which a determination is made to whether the IO-expander has booted or awaken. Upon completion of the IO-expander boot or awakening, the IO-expander asserts an IOE_RST_SYNC_ACK #signal at its PLTRST #pin signaling completion of the IO-expander boot/awaken phase, as depicted by an end block 514. In one embodiment, platform component 404 is configured to verify an IOE_RST_SYNC_ACK #signal has been asserted by each IO-expander and send an aggregated IOE_RST_SYNC_ACK signal to the GPIO #7 pin on the legacy PCH.

Returning to decision block 508, upon receipt of the aggregated IOE_RST_SYNC_ACK signal from platform component 404 at the GPIO #7 pin (or expiration of the timer), the answer to decision block 508 is YES and the legacy PCH logic proceeds to a block 516 in which the legacy PCH generates a reset to all CPUs and the boot/awaken phase for the legacy PCH completes in an end block 518. As shown in FIGS. 4 and 5, the CPU reset is generated by asserting a signal at the PLTRST #pin on legacy PCH 202, which is received by platform component 404, which in turn asserts a PLTRST_CPU for each system CPU.

As discussed above, the control entity (e.g., platform component 404) may be configured to effect various policies depending on whether all IO expanders boot. The particular policy or set of policies to be implemented is generally a user or operator/implementor decision that is outside the scope of this disclosure.

Working State S0 to Sx Sleep State Entry

Figure 6:
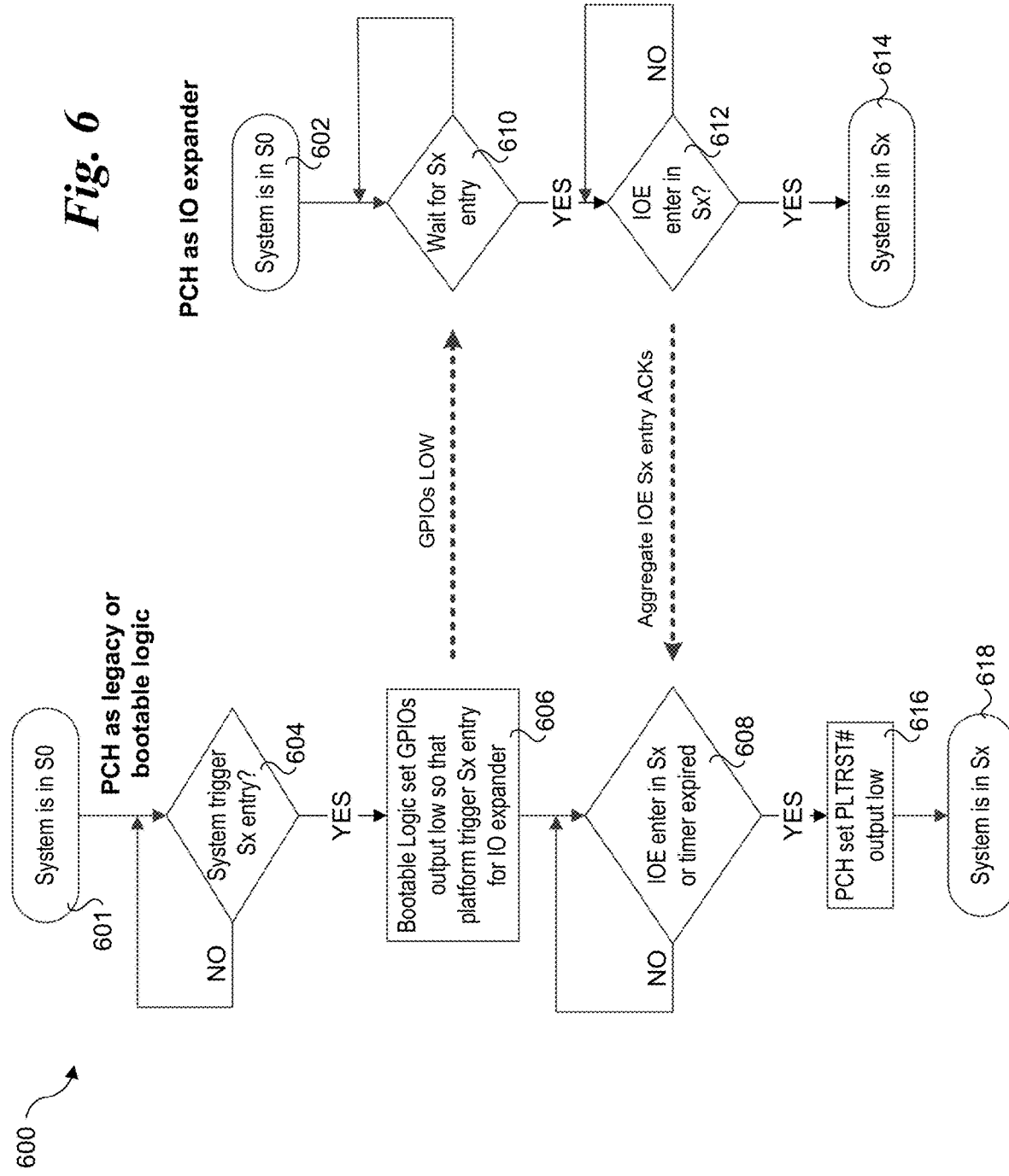
FIG. 6 is a flowchart illustrating handshake operations and logic performed for a legacy PCH or CPU with bootable logic and an IO-expander to coordinate entry into an Sx sleep state from working state S0.

FIG. 6 shows a flowchart 600 illustrating handshake operations and logic performed for a legacy PCH or CPU with bootable logic and an IO-expander to enter an Sx sleep state (ACPI S1-S4) from working state S0. As before, the operations for the legacy PCH/bootable CPU and IO-expander are performed concurrently, beginning with start blocks 601 and 602 where both the legacy PCH/bootable CPU and IO-expander are operating in ACPI working state S0.

In a decision block 604 a determination is made to whether the system has triggered an SX entry. Once the Sx entry is detected, the logic proceeds to a block 606 in which the legacy PCH or bootable logic sets the GPIOs output low so that the platform triggers an SX entry for the IO-expander. The legacy PCH logic then proceeds to a decision block 508 to wait for the IO-expander and GPIO response or expiration of a timer.

In parallel, as depicted by a decision block 610 and the loop back to itself, the IO-expander waits for Sx entry by detecting low GPIO signals output from platform component 404. Upon detecting Sx entry, the IO-expander logic proceeds to a decision block 612 in which a determination is made to whether the IO-expander has entered the Sx sleep state. Upon detection that the IO-expander has entered the Sx state, the IO-expander returns an ACK handshake signal (Reset_Sync_ACK #) to the legacy PCH or bootable CPU indicating the IO-expander has entered the Sx state. Also as shown in an end block 614 the IO-expander is in the Sx state. In one embodiment platform component 404 verifies that it has received ACKs from each IO-expander indicating it has entered the Sx state and then sends an aggregated ACK to the legacy PCH or bootable logic.

Returning to decision block 608, upon receipt of the aggregated ACK signal from platform component 404 (or expiration or the timer), the answer to decision block 608 is YES and the legacy PCH or bootable logic proceeds to a block 616 in which the legacy PCH sets its PLTRST #output to low, and the flow for the PCH completes, as depicted in an end block 518. As shown in FIGS. 4 and 5, the CPU reset is generated by asserting a signal at the platform reset signals (PLTRST #) pin output on legacy PCH 202 (FIG. 4) or IO-expander 102-1 (FIG. 3) to low. As shown in an end block 618, the system is in the Sx state.

Figure 7:
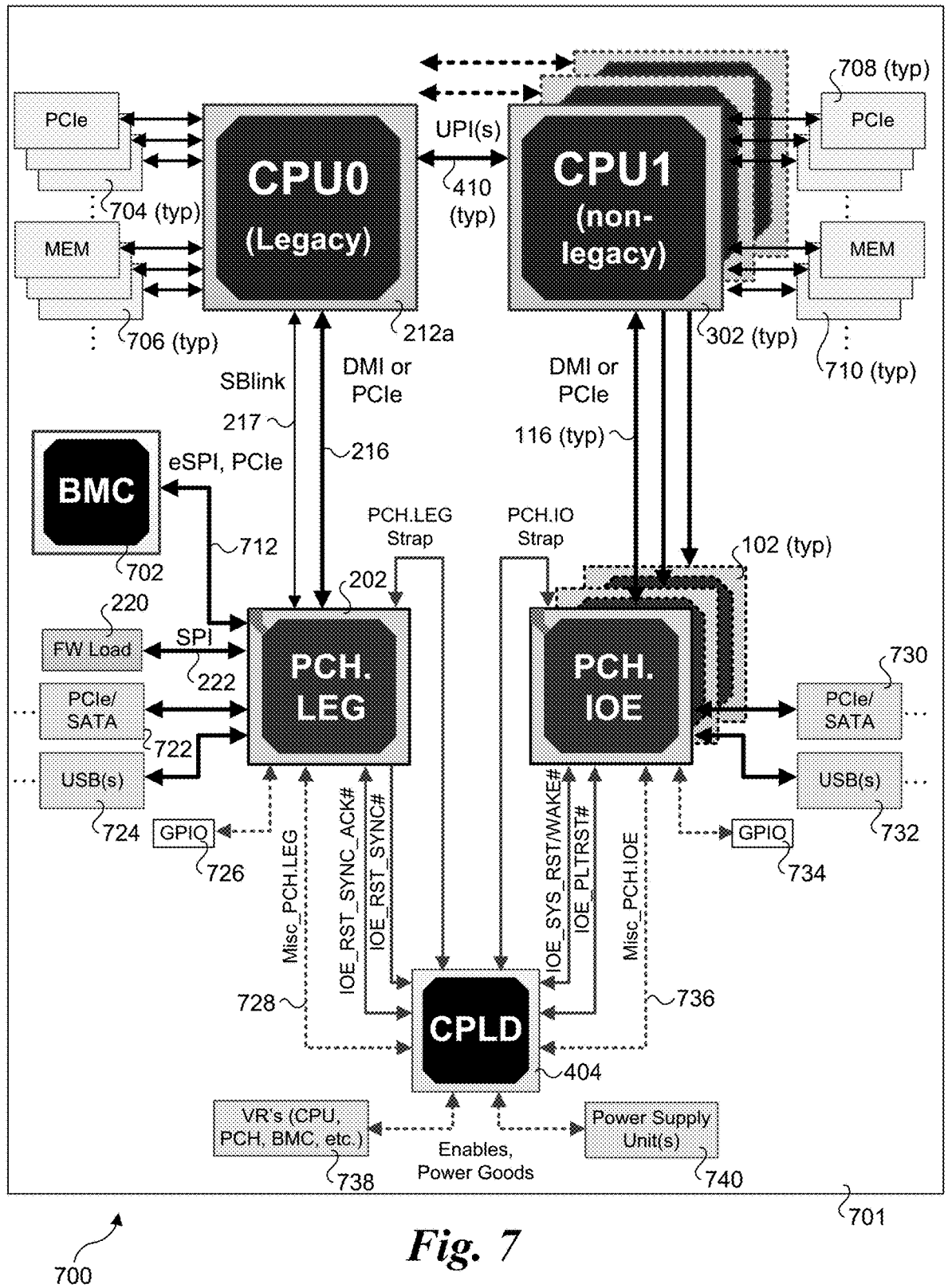
FIG. 7 is a schematic diagram of a multi-socket platform illustrating further details of the multi-socket platform of FIG. 4, according to one embodiment.

FIG. 7 shows an embodiment of a multi-socket compute platform 700 illustrating further details of the multi-socket platform of FIG. 4, according to one embodiment. Compute platform 700 includes a main board 701 to which various components are mounted or "socketed" (i.e., installed in a socket that is mounted to main board 701) or otherwise installed into a connector or the like. The components include a legacy CPU 212a, one or more non-legacy CPUs 302, a legacy PCH 202, one or more IO-expanders 102, a CPLD 404, and a baseboard management controller (BMC) 712.

legacy CPU 212a includes one or more PCIe interfaces 704 and an integrated memory controller (IMC, not shown) coupled to one or more memory devices 706 via one or more memory channels. Similarly, each of non-legacy CPUs 302 includes one or more PCIe interfaces 708 and an IMC coupled to one or more memory devices 710 via one or more memory channels. Under one embodiment, each of non-legacy CPU 302 is coupled to legacy CPU 212 via a UPI link 410. As discussed above, the CPUs on a multi-socket platform may interconnected to form a loop or continuous chain, in which case some non-legacy CPUs 302 are not directly connected to legacy CPU 212a via a UPI link (or other type of socket-to-socket interconnect). Optionally, the multi-socket platform topology may employ a full interconnect topology where each socket is connected to all other sockets.

As with FIG. 4, legacy CPU 212a is connected to legacy PCH 202 via a sideband link 217 and a CPU-PCH interconnect 216. BMC 702 is connected to legacy PCH 202 via an Enhanced Serial Peripheral Interface Bus (eSPI) or PCIe link 712. legacy PCH 202 is also connected to a firmware storage device 220 via an SPI bus 222 and includes one or more PCIe or SATA interfaces 722 (this could be a combination of PCIe and SATA interfaces) and one or more USB interfaces 724. legacy PCH 202 also has interfaces for supporting various GPIO signals 726, miscellaneous PCH.LEG signals 728, as well as IOE_RST_SYNC_ACK #signals and IOE_RST_SYNC #signals used for handshake signals between legacy PCH 202 and CPLD 404, wherein miscellaneous PCH.LEG signals 728 is used collectively illustrate the miscellaneous handshake signals sent between legacy PCH 202 and CPLD 404 in FIG. 4.

Each IO-expander 102 includes one or more PCIe or SATA interfaces 730 and one or more USB interfaces 732, and has interfaces for supporting various GPIO signals 734, miscellaneous PCH.IOH signals 736, as well as IOE_SYS_RST/WAKE #signals and IOE_PLTRST #signals, wherein miscellaneous PCH.IOH signals 736 is used collectively illustrate the miscellaneous handshake signals sent between an IO-expander 102 and CPLD 404 in FIG. 4.

In addition to the functionality provided by the platform components illustrated in the foregoing Figures and described above, a platform component may be used to provide additional functionality. For example, such platform components may interface with CPUs, PCHs, BMC, etc., as depicted in a block 738, and may interface with one or more power supply units 740. As illustrated in FIG. 4, platform component 404 provides CPUPWRGOOD and PLTRST_CPU signals to legacy CPU 212a and each of non-legacy CPUs 302.

Figure 7A:
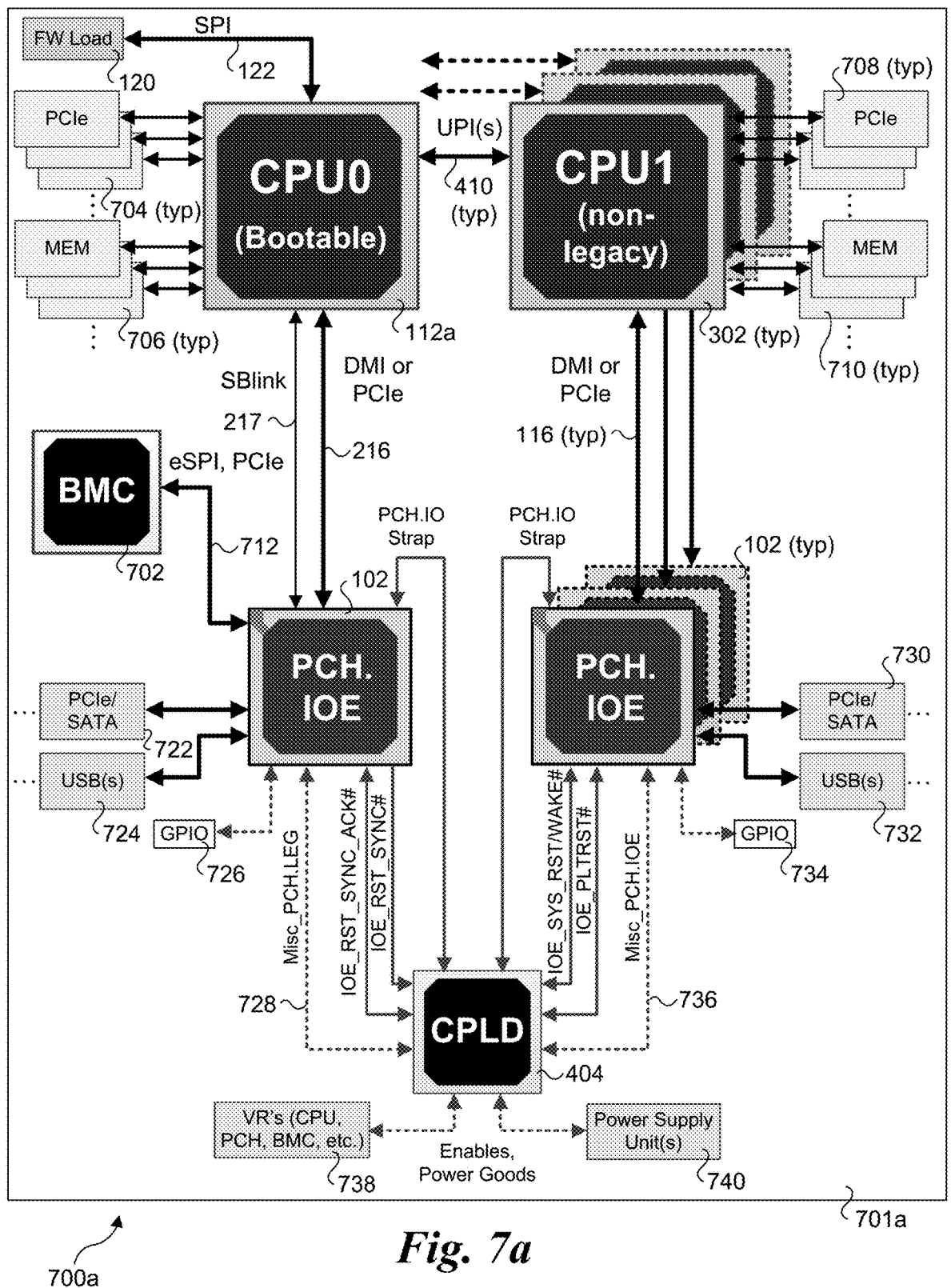
FIG. 7a is a schematic diagram of a multi-socket compute platform illustrating further details of the multi-socket platform FIG. 3, according to one embodiment.

FIG. 7a shows an embodiment of a multi-socket compute platform 700a illustrating further details of the multi-socket platform scheme illustrated in FIG. 3, according to one embodiment. In compute platform 700a, various illustrated components are coupled (mounted directly or via sockets and/or connectors) to a main board 701a. As identified by like-numbers components in FIGS. 7 and 7a, the architectures of compute platforms 700 and 700a are similar, with the differences including the use of a bootable CPU 112a in place of legacy CPU 212a and the use of an IO-expander 102 in place of legacy PCH 202. As further shown in FIG. 7a, bootable CPU 112a is connected to a firmware storage device 120 via an SPI 122 and configured to load firmware stored in the firmware storage device to boot itself and the platform.

Figure 8:
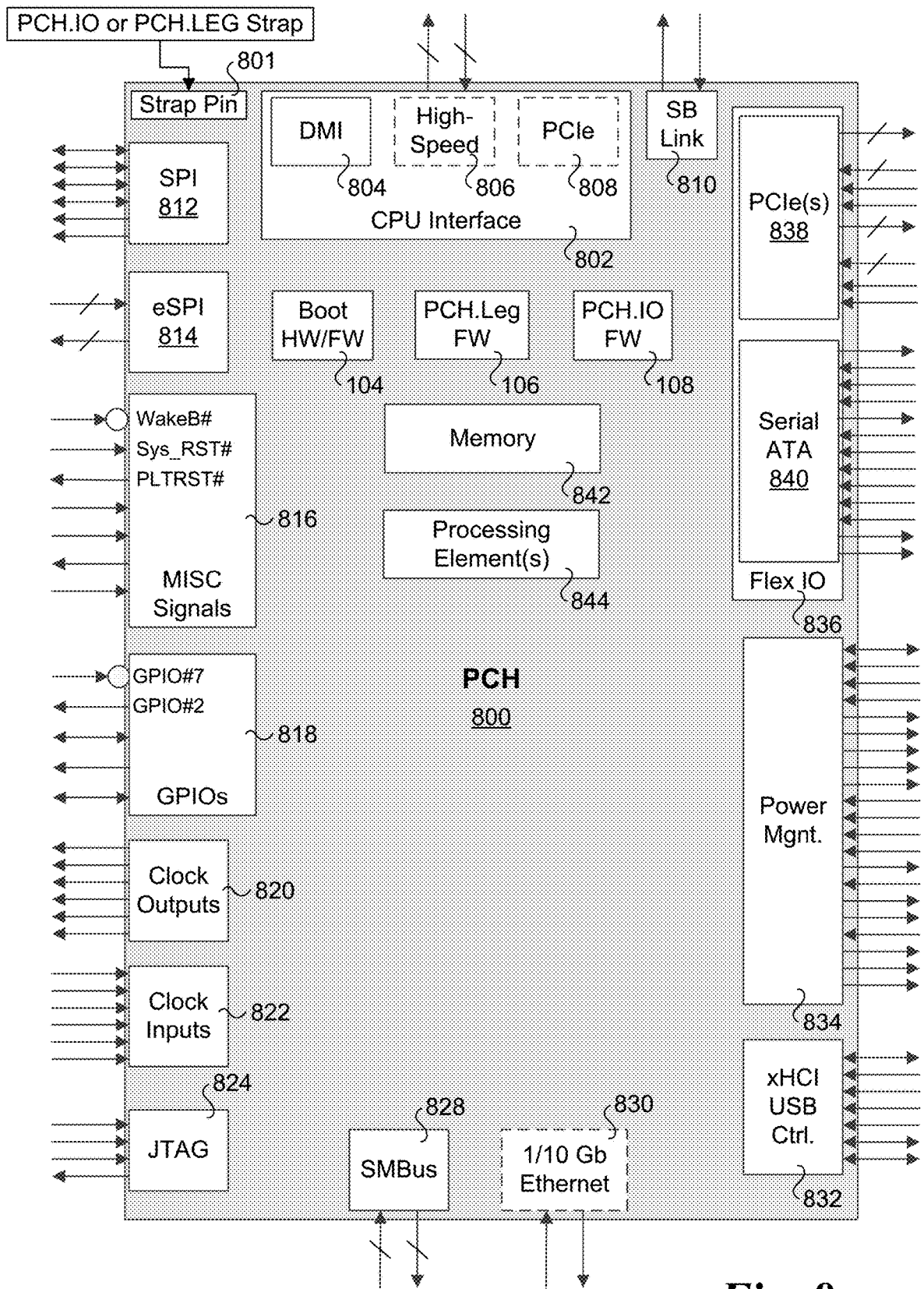
FIG. 8 is a schematic diagram of a multi-role PCH that may be implemented as a legacy PCH or IO-expander in accordance with the embodiments disclosed herein.

A multi-role PCH 800 that may be dynamically configured as a legacy PCH or an IO-expander is shown in FIG. 8. Multi-role PCH 800 includes a strap pin 801 that receives a high- or low-logic signal used to select whether the multi-role PCH is to operate as a legacy PCH or IO-expander. A CPU interface comprising a DMI 04, an optional high-speed chip-to-chip interface 806 and an optional PCIe interface 808 is used for communication with a CPU via a CPU-PCH interface. A sideband link (SBLink) 810 to support additional communication signals when multi-role PCH 800 is implemented as a legacy PCH coupled to a legacy processor is also provided, such as shown by SBLINK #217 in FIGS. 2 and 4.

Multi-role PCH 800 includes various types of IO interfaces and buses, including an SPI 812, an eSPI 814, miscellaneous IO signals 816, GPIOs 818, an LPC bus 826, an SMBus 828, and an eXtensible Host Controller Interface (xHCI) USB controller 832. Multi-role PCH 800 further includes a flexible IO interface 836 providing multiple IO signals that may be configured as PCIe root ports, PCIe interfaces, Serial ATA (SATA) interfaces of USB 3.0 interfaces, such as depicted by PCIe interface(s) 838 and a SATA interface 840. Optionally, a multi-role PCH may be configured with separate PCIe and SATA interfaces having dedicated IO pins. Additional IO interfaces include clock outputs 820, clock inputs 822, a JTAG (Joint Test Action Group) interface 824, and a power management controller and interface 834. As further illustrated in FIG. 8, multi-role PCH 800 may also include an optional 1/10 Gb Ethernet interface.

As described and illustrated above, the multi-role PCH includes hardware and firmware for supporting boot functionality and for implementing the legacy PCH and IO-expander roles. Thus, multi-role PCH 800 includes boot HW/FW 104, legacy PCH firmware 106, and IO-expander firmware 108. The firmware, as applicable, may be loaded into memory 842 and executed on one or more processing elements 844, or otherwise be loaded directly into registers for processing elements 844 and executed. Processing element(s) 844 may include any type of processing element that is suitable for executing firmware instructions while meeting applicable performance requirements, including but not limited to an embedded processor with one or more cores, one or more microcontrollers, one or more processing engines or the like, etc.

As depicted in FIG. 8, the GPIO #7 and the GPIO #2 (I/O) pins are among the GPIOs 818, while the WakeB #, Sys_RST #and PLTRST #(I/O) pins are among the miscellaneous signals 816. However, this is merely exemplary and non-limiting, as the same or different IO interfaces may be implemented to send and/or receive the various handshake signals described herein.

In addition to the illustrated components, a multi-role PCH may include additional interfaces and/or be configured to support additional functionality, such as but not limited to a real-time clock interface, one or more interrupt controllers, timer functions, audio, display, and/or keyboard interfaces, and an innovation engine or manageability controller (or interfaces to the same). In addition to execution of firmware on one or more processing elements, functionality associated with some of the IO interfaces may be implemented using some form of embedded logic, such as pre-programmed (e.g., an Application Specific Integrated Circuit (ASIC) or programmable logic (CPLD, FPGA, etc.). Further inputs that are not shown include power inputs and ground inputs.

The multi-role PCH solutions and associated methods and compute platforms provide several advantages over existing approaches. For example, use of PCHs as IO-expanders enables CPUs to free up PCIe lanes. Currently some server CPUs use a 16 lane PCIe Root Port that is dedicated to a PCH even though only 8 PCIe lanes are actually used (mainly for CPU-Manageability Engine communication). By using a PCH as an IO-expander, the CPU can bifurcate the PCIe lanes and present them as DMI through the IO expander while maintaining PCIe semantics on the root port and use the remaining x8 lanes.

The solution enables OEMs to reuse PCH capabilities on PCH-less platforms while providing proprietary solutions such as USB HCI debug, clocking and PCIe functions for manageability or storage and SATA IOs etc. The multi-role PCH solution enables the same PCH SoC to have multiple personalities including as a current platform controller, existing PCH for Client and as an IO expander for server.

When a PCH is implemented as IO-expander, HCI (or xHCI) can be used to provide debug capabilities without requiring integration of HCI or xHCI on the CPU. When a Manageability Engine (ME) is connected to an IO-expander, the ME will look like a root complex integrated end point, enabling the usage of an ME for performing platform manageability functions.

In the foregoing disclosure and Figures, the terminology "platform controller hub" and "PCH" has been used. However, this is not meant to be limiting and other terminology may be used in the industry for devices with similar functionality. For example, a PCH is the term Intel® corporation uses for a controller hub; accordingly, the term "controller hub" may be used as an alternative term to PCH herein, including the claims.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software or firmware running on a processing element, via embedded hardware or the like, or via a combination of hardware and software/firmware. Such components may be implemented as software/firmware modules, hardware modules, special-purpose hardware (e.g., application specific hardware, ASICs, DSPs, etc.), embedded controllers, hardwired circuitry, hardware logic, etc. Software and firmware content (e.g., data, instructions, configuration information, etc.) may be provided via an article of manufacture including non-transitory computer-readable or machine-readable storage medium, which provides content that represents instructions that can be executed. The content may result in a computer or compute platform performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a platform including one or more central processing units (CPUs), a firmware storage device in which platform firmware is stored, and one or more controller hubs coupled to a platform control entity, each controller hub including a plurality of Input-Output (TO) interfaces and coupled to a respective CPU, each controller hub including at least one pin strap used to configure the controller hub to be implemented as a legacy controller hub or an IO-expander, the method comprising:
    configurating at least one controller hub to be implemented as an IO expander under which the controller hub is used to expand the IO interfaces available to the CPU to which the controller hub is coupled; and
    detecting a logic level at the at least one pin strap, and, in response thereto configuring the controller hub to be implemented as a legacy controller hub or an IO-expander.

2. The method of claim 1, wherein one of the one or more CPUs is a legacy CPU coupled to a legacy controller hub, further comprising:
    booting the platform by sending at least a portion of the platform firmware to the legacy CPU via the legacy controller hub.

3. The method of claim 2, wherein the platform includes one or more controller hubs separate from the legacy controller hub, further comprising:
    configuring the one or more controller hubs separate from the legacy controller hub as IO expanders;
    in connection with booting the platform or waking the platform from a sleep state,
        triggering, via the legacy controller hub, the platform to assert a wake up for each IO-expander;
        sending a wake signal from the platform control entity to each IO-expander; and
        for each IO-expander, in response to receiving a wake signal, initiating booting of the IO-expander.

4. The method of claim 3, further comprising:
    for each IO-expander,
        when the IO-expander completes booting, returning an acknowledgement (ACK) signal to the platform control entity to indicate the IO-expander has booted;
    verifying, via the platform control entity that each IO-expander has booted;
    sending an aggregated ACK to the legacy controller hub indicating each IO-expander has booted; and
    generating, via the legacy controller hub, a reset of the one or more CPUs.

5. The method of claim 1, wherein the compute platform includes a plurality of controller hubs and the plurality of CPUs include a CPU with bootable logic that is coupled to the firmware storage device and coupled to a first controller hub, further comprising:
    configuring each of the plurality of controller hubs including the first controller hub to operate as an IO-expander;

booting the platform by accessing the platform firmware stored in the firmware storage device via the CPU with bootable logic;

booting the first controller hub; and coordinating booting of each of the IO-expanders other than the first controller hub via handshake signals sent between the first controller hub and the platform control entity and handshake signals sent between the platform control entity and each of those IO-expanders.

6. The method of claim 5, wherein each of the plurality of controller hubs include a plurality of IO pins coupled to a set of handshake wires, further comprising:

sending a platform reset handshake signal from a first IO pin of the first controller hub to the platform control entity;

for each controller hub other than the first controller hub,
receiving a wake handshake signal from the platform control entity at a second IO pin;
booting or waking the controller hub; and
when the controller hub has successfully booted or has awaken, sending a wake acknowledgement (ACK) signal from a third IO pin on the controller hub to the platform control entity;

verifying, via the platform control entity, that a wake ACK signal has been received from each controller hub other than the first controller hub; and triggering a reset for each of the plurality of CPUs.

7. The method of claim 1, further comprising:

detecting the platform has triggered entry from a normal operating state to a sleep state;

triggering entry of each IO expander to enter the sleep state;

for each IO expander,
entering the sleep state; and
returning an acknowledgement (ACK) handshake signal to the platform control entity indicating the IO-expander has entered the sleep state.

8. The method of claim 7, wherein each controller hub includes one or more General Purpose IO (GPIO) pins coupled to a respective handshake line coupled between the controller hub and the platform control entity, and wherein an IO-expander is triggered to enter a sleep state by setting a voltage level of handshake signals output by the platform control entity that are coupled to GPIO input pins on each controller hub to a predefined logic level.

9. The method of claim 1, wherein the platform control entity comprises one of:

a discrete device comprising a complex programmable logic device (CLPD);

a discrete device comprising a field programmable gate array (FPGA);

a discrete device comprising an embedded controller;

a logic block in one of the plurality of CPUs; or a discrete device in a multi-chip package including one of the plurality of CPUs.

10. A compute platform comprising:

a plurality of central processing units (CPUs), each CPU associated with a respective socket and connected to at least one other CPU via a socket-to-socket interconnect;

a firmware storage device in which platform firmware is stored;

one or more controller hubs, each controller hub connected to a respective CPU and having a plurality of Input-Output (TO) interfaces, at least one controller hub configured to be implemented as an IO-expander under which the controller hub is used to expand the IO interfaces available to a CPU to which the controller hub is coupled; and a platform control entity, coupled to each controller hub via a respective set of handshake wires, wherein the platform is configured to control booting of each of the at least one controller hubs configured to be implemented as an IO-expander using handshake signals exchanged over the set of handshake wires coupling that controller hub to the platform control entity, wherein one of the plurality of CPUs is a legacy CPU that is not capable of booting on its own that is coupled to a first controller hub that is coupled to the firmware storage device, wherein the first controller hub is implemented as a legacy controller hub, wherein the platform is booted by accessing the platform firmware stored in the firmware storage device via the legacy controller hub and sending at least a portion of the platform firmware that is accessed to the legacy CPU.

11. The compute platform of claim 10, further configured to:

in connection with booting the platform or waking the platform from a sleep state,
trigger, via the legacy controller hub, the platform to assert a wake up for each IO-expander;
send a wake signal from the platform control entity to each IO-expander; and
for each IO-expander, in response to receiving a wake signal, initiating booting or waking of the IO-expander.

12. The compute platform of claim 11, further configured to:

for each IO-expander,
when the IO-expander completes booting or waking, return an acknowledgement (ACK) signal to the platform control entity to indicate the IO-expander has booted or awaken;
verify, via the platform control entity that each IO-expander has booted or awaken;
send an aggregated ACK to the legacy controller hub indicating each IO-expander has booted or awaken; and
generate, via the legacy controller hub, a reset of the CPUs connected to the IO-expanders.

13. The compute platform of claim 10, wherein the platform includes a firmware storage device in which platform firmware is stored, a plurality of CPUs, and a plurality of controller hubs, wherein one of the plurality of CPUs includes bootable logic and is coupled to the firmware storage device and coupled to a first controller hub, wherein each of the plurality of controller hubs including the first controller hub is configured as an IO-expander, and wherein the compute platform is further configured to:

boot by accessing the platform firmware stored in the firmware storage device via the CPU with bootable logic;

boot the first controller hub; and coordinate booting of each of the IO-expanders other than the first controller hub via handshake signals sent between the first controller hub and the platform control entity and handshake signals sent between the platform control entity and each of those IO-expanders.

14. A method implemented on a platform including a plurality of central processing units (CPUs), a firmware storage device in which platform firmware is stored, and one or more controller hubs coupled to a platform control entity, each controller hub including a plurality of Input-Output (TO) interfaces, a plurality of IO pins coupled to a set of handshake wires, and coupled to a respective CPU, the plurality of CPUs including a CPU with bootable logic that is coupled to the firmware storage device and coupled to a first controller hub the method comprising:
- configuring each of the plurality of controller hubs including the first controller hub to operate as an IO-expander under which the controller hub is used to expand the IO interfaces available to the CPU to which the controller hub is coupled;
- booting the platform by accessing the platform firmware stored in the firmware storage device via the CPU with bootable logic;
- booting the first controller hub;
- coordinating booting of each of the IO-expanders other than the first controller hub via handshake signals sent between the first controller hub and the platform control entity and handshake signals sent between the platform control entity and each of those IO-expanders;
- sending a platform reset handshake signal from a first IO pin of the first controller hub to the platform control entity;
- for each controller hub other than the first controller hub,
  - receiving a wake handshake signal from the platform control entity at a second IO pin;
  - booting or waking the controller hub; and
  - when the controller hub has successfully booted or has awaken, sending a wake acknowledgement (ACK) signal from a third IO pin on the controller hub to the platform control entity;
- verifying, via the platform control entity, that a wake ACK signal has been received from each controller hub other than the first controller hub; and
- triggering a reset for each of the plurality of CPUs.

* * * * *

UNITED STATES PATENT AND TRADEMARK OFFICE
CERTIFICATE OF CORRECTION

PATENT NO. : 11,874,787 B2
APPLICATION NO. : 16/790648
DATED : January 16, 2024
INVENTOR(S) : Amit K Srivastava et al.

It is certified that error appears in the above-identified patent and that said Letters Patent is hereby corrected as shown below:

In the Claims

Column 14, Lines 13-29 Claim 1 should read:
A method implemented on a platform including one or more central processing units (CPUs), a firmware storage device in which platform firmware is stored, and one or more controller hubs coupled to a platform control entity, each controller hub including a plurality of Input-Output (IO) interfaces and coupled to a respective CPU, each controller hub including at least one pin strap used to configure the controller hub to be implemented as a legacy controller hub or an IO-expander, the method comprising:
 configurating at least one controller hub to be implemented as an IO expander under which the controller hub is used to expand the IO interfaces available to the CPU to which the controller hub is coupled; and
 detecting a logic level at the at least one pin strap, and, in response thereto configuring the controller hub to be implemented as a legacy controller hub or an IO-expander.

Column 15, Line 57-Column 16, Line 19 Claim 10 should read:
A compute platform comprising:
 a plurality of central processing units (CPUs), each CPU associated with a respective socket and connected to at least one other CPU via a socket-to-socket interconnect;
 a firmware storage device in which platform firmware is stored;
 one or more controller hubs, each controller hub connected to a respective CPU and having a plurality of Input-Output (IO) interfaces, at least one controller hub configured to be implemented as an IO-expander under which the controller hub is used to expand the IO interfaces available to a CPU to which the controller hub is coupled; and
 a platform control entity, coupled to each controller hub via a respective set of handshake wires,
 wherein the platform is configured to control booting of each of the at least one controller hubs configured to be implemented as an IO-expander using handshake signals exchanged over the set of handshake wires coupling that controller hub to the platform control entity, wherein one of the plurality of CPUs is a legacy CPU that is not capable of booting on its own that is coupled to a first Signed and Sealed this
Sixteenth Day of April, 2024

*Katherine Kelly Vidal*
Katherine Kelly Vidal
*Director of the United States Patent and Trademark Office*

CERTIFICATE OF CORRECTION (continued)
U.S. Pat. No. 11,874,787 B2 controller hub that is coupled to the firmware storage device, wherein the first controller hub is implemented as a legacy controller hub, wherein the platform is booted by accessing the platform firmware stored in the firmware storage device via the legacy controller hub and sending at least a portion of the platform firmware that is accessed to the legacy CPU.

Column 16, Line 62-Column 18, Line 16 Claim 14 should read:
A method implemented on a platform including a plurality of central processing units (CPUs), a firmware storage device in which platform firmware is stored, and one or more controller hubs coupled to a platform control entity, each controller hub including a plurality of Input-Output (IO) interfaces, a plurality of IO pins coupled to a set of handshake wires, and coupled to a respective CPU, the plurality of CPUs including a CPU with bootable logic that is coupled to the firmware storage device and coupled to a first controller hub the method comprising:
    configuring each of the plurality of controller hubs including the first controller hub to operate as an IO-expander under which the controller hub is used to expand the IO interfaces available to the CPU to which the controller hub is coupled;
    booting the platform by accessing the platform firmware stored in the firmware storage device via the CPU with bootable logic;
    booting the first controller hub;
    coordinating booting of each of the IO-expanders other than the first controller hub via handshake signals sent between the first controller hub and the platform control entity and handshake signals sent between the platform control entity and each of those IO-expanders;
    sending a platform reset handshake signal from a first IO pin of the first controller hub to the platform control entity;
    for each controller hub other than the first controller hub,
        receiving a wake handshake signal from the platform control entity at a second IO pin;
        booting or waking the controller hub; and
        when the controller hub has successfully booted or has awaken, sending a wake acknowledgement (ACK) signal from a third IO pin on the controller hub to the platform control entity;
    verifying, via the platform control entity, that a wake ACK signal has been received from each controller hub other than the first controller hub; and
    triggering a reset for each of the plurality of CPUs.